July 30, 1968 C. H. MAYER 3,394,584
VALVE CORE TESTING MACHINE
Filed May 4, 1966 7 Sheets-Sheet 5
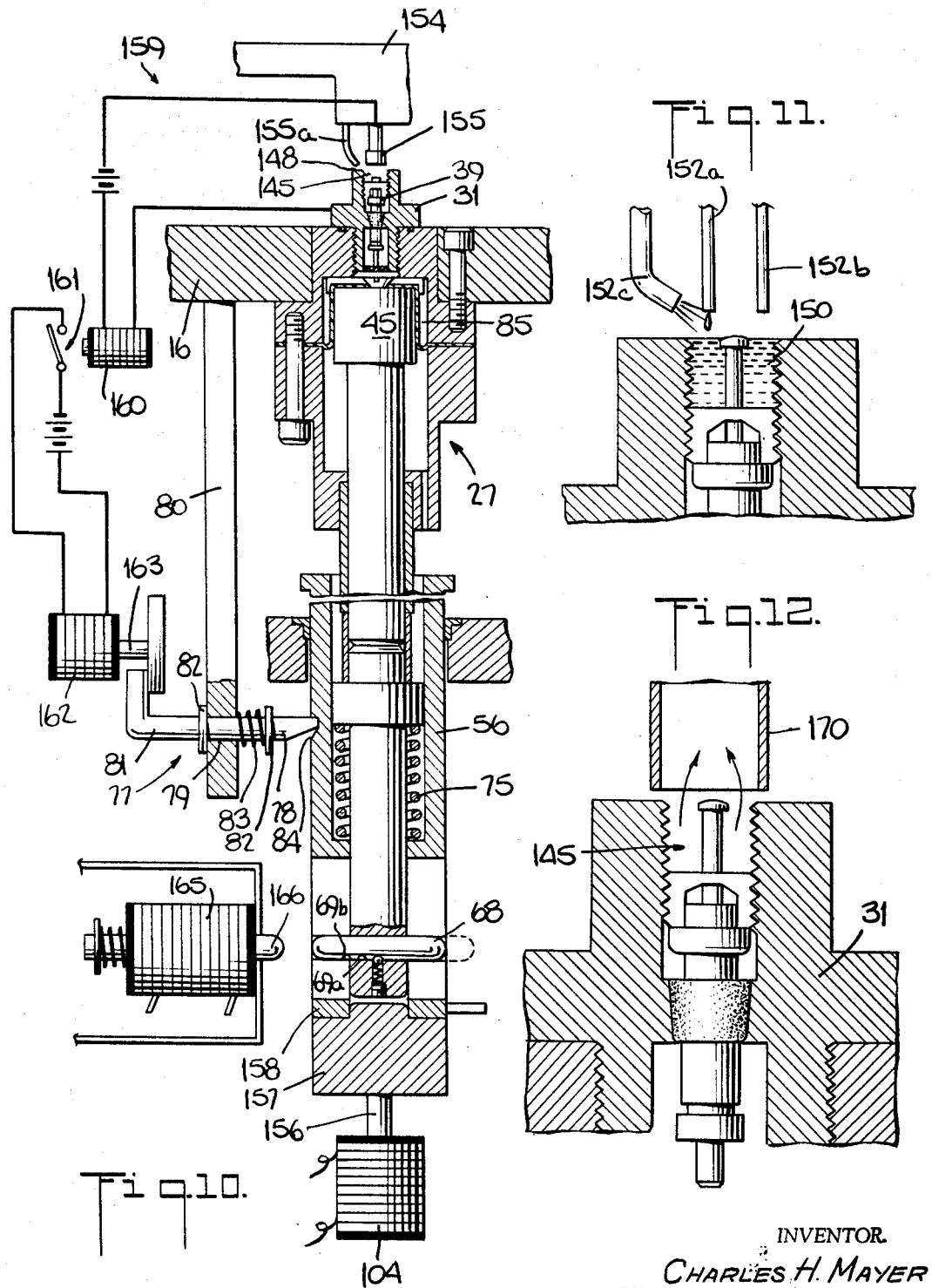
INVENTOR.
CHARLES H. MAYER
BY
Kenyon & Kenyon
ATTORNEYS

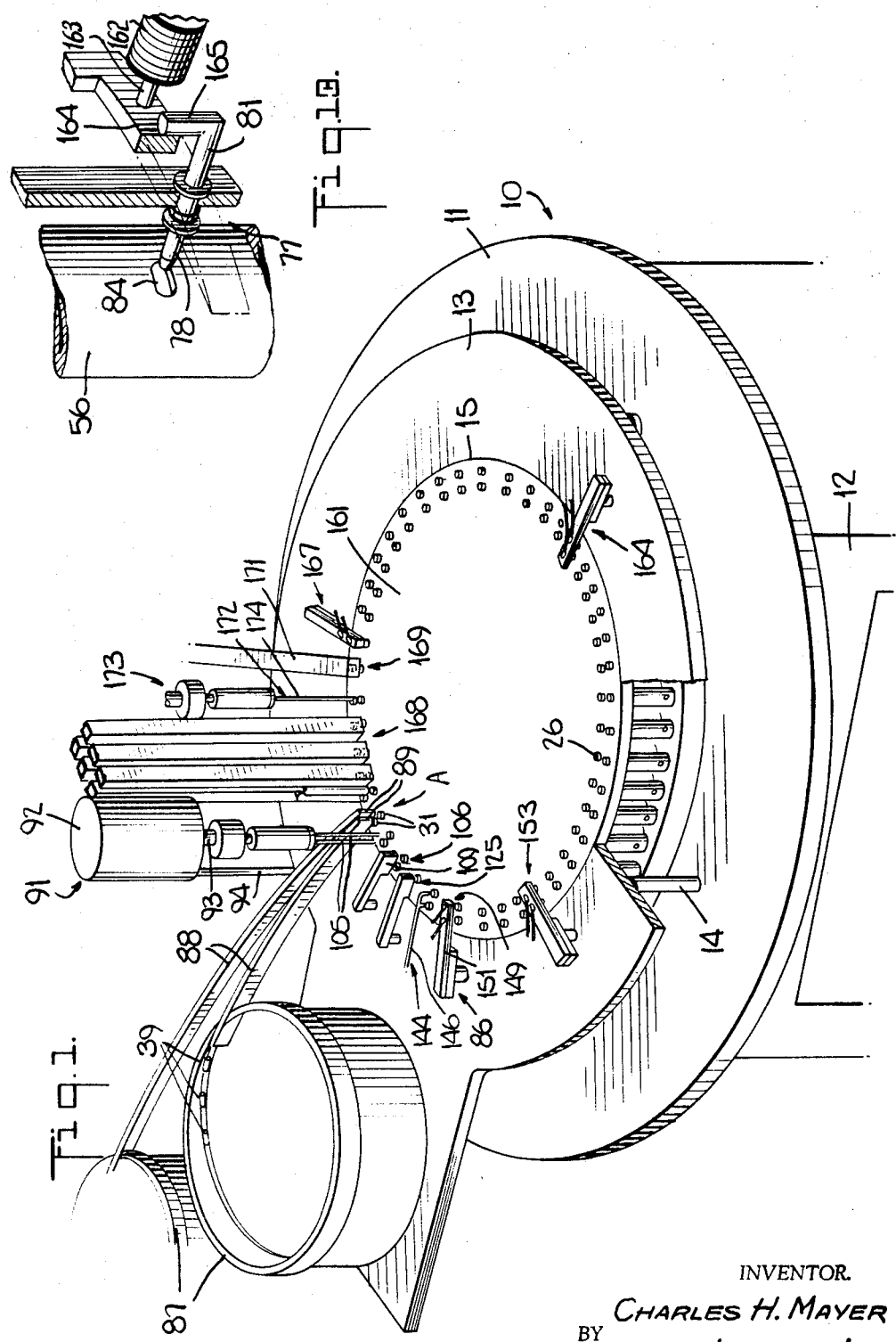

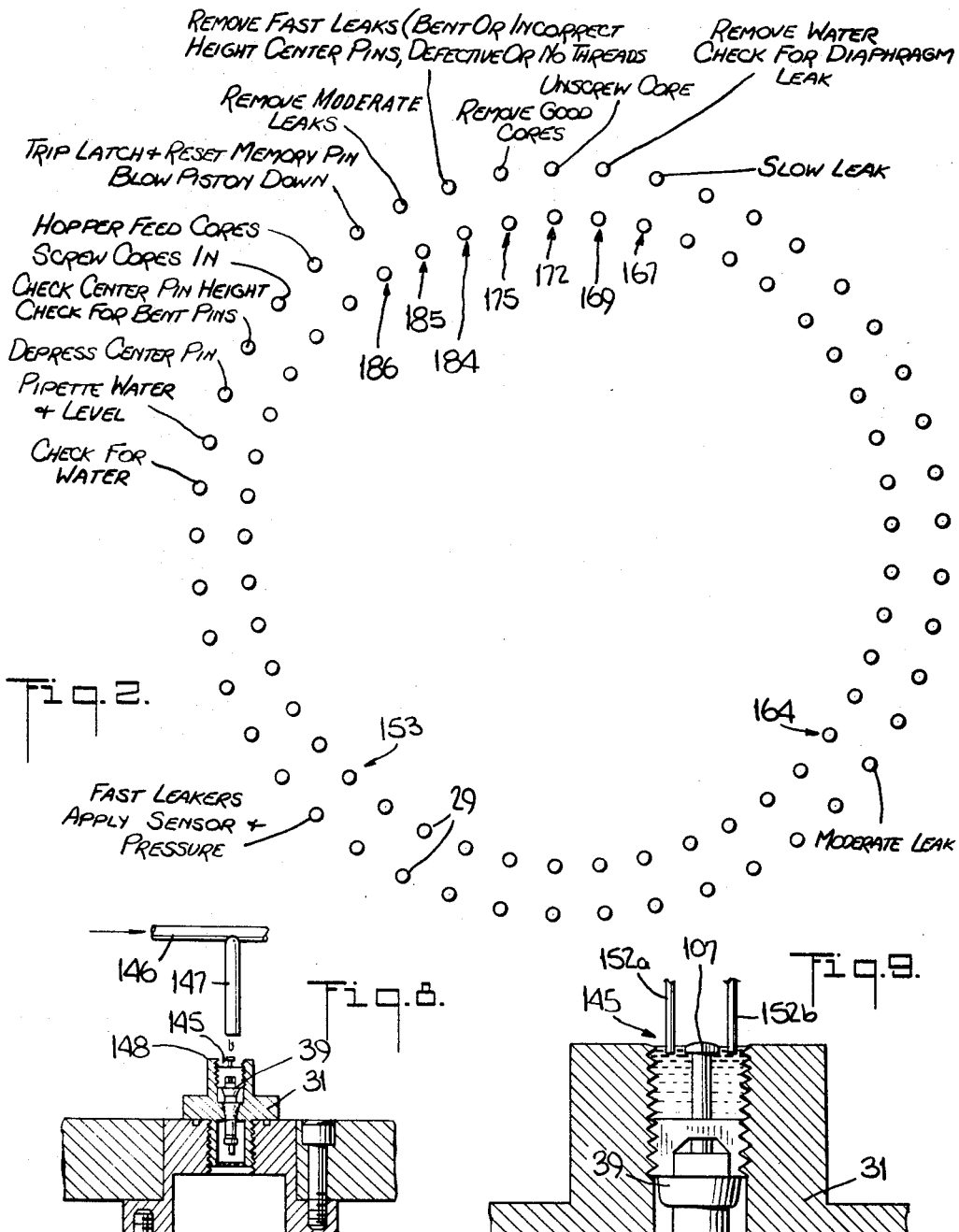

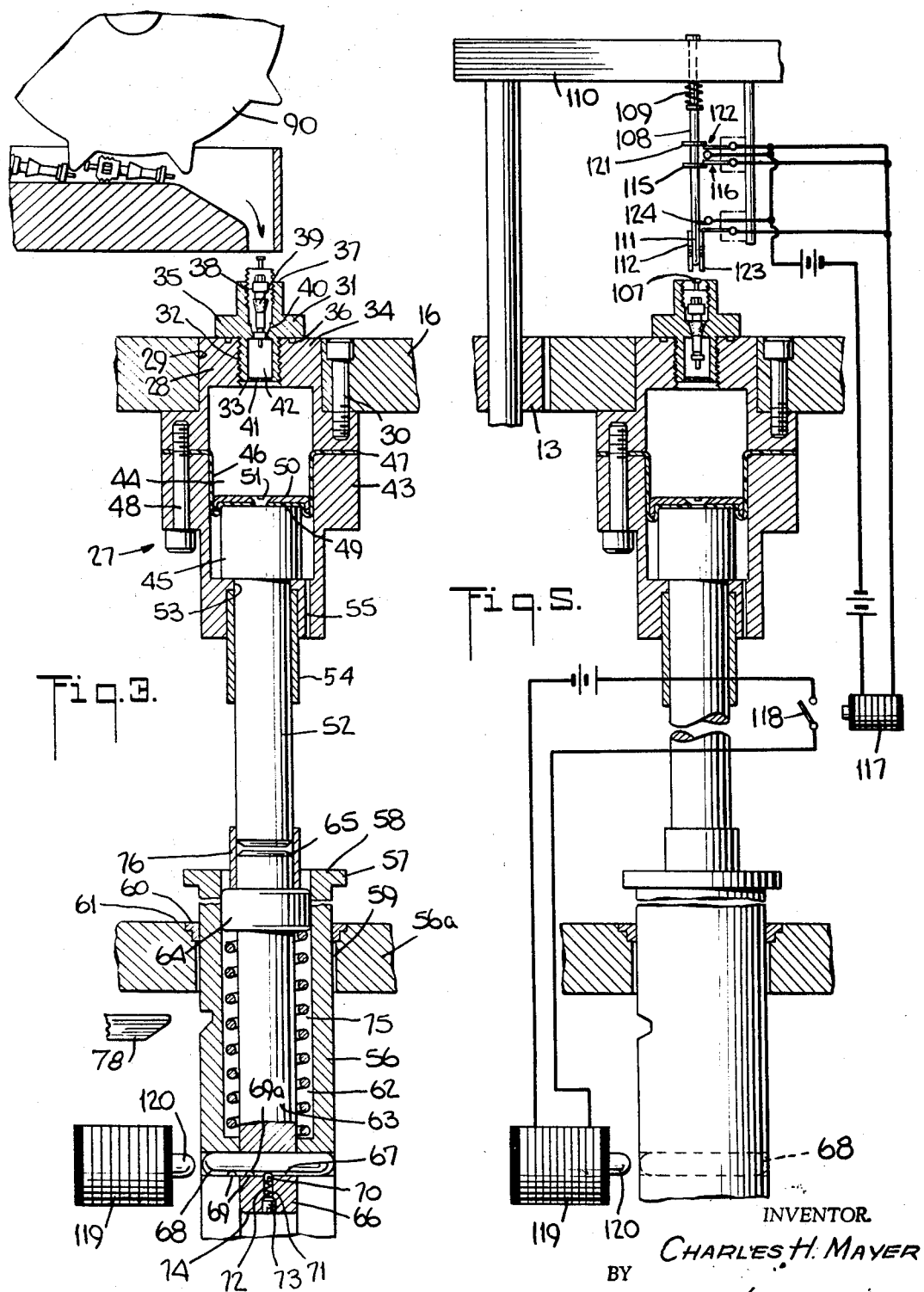

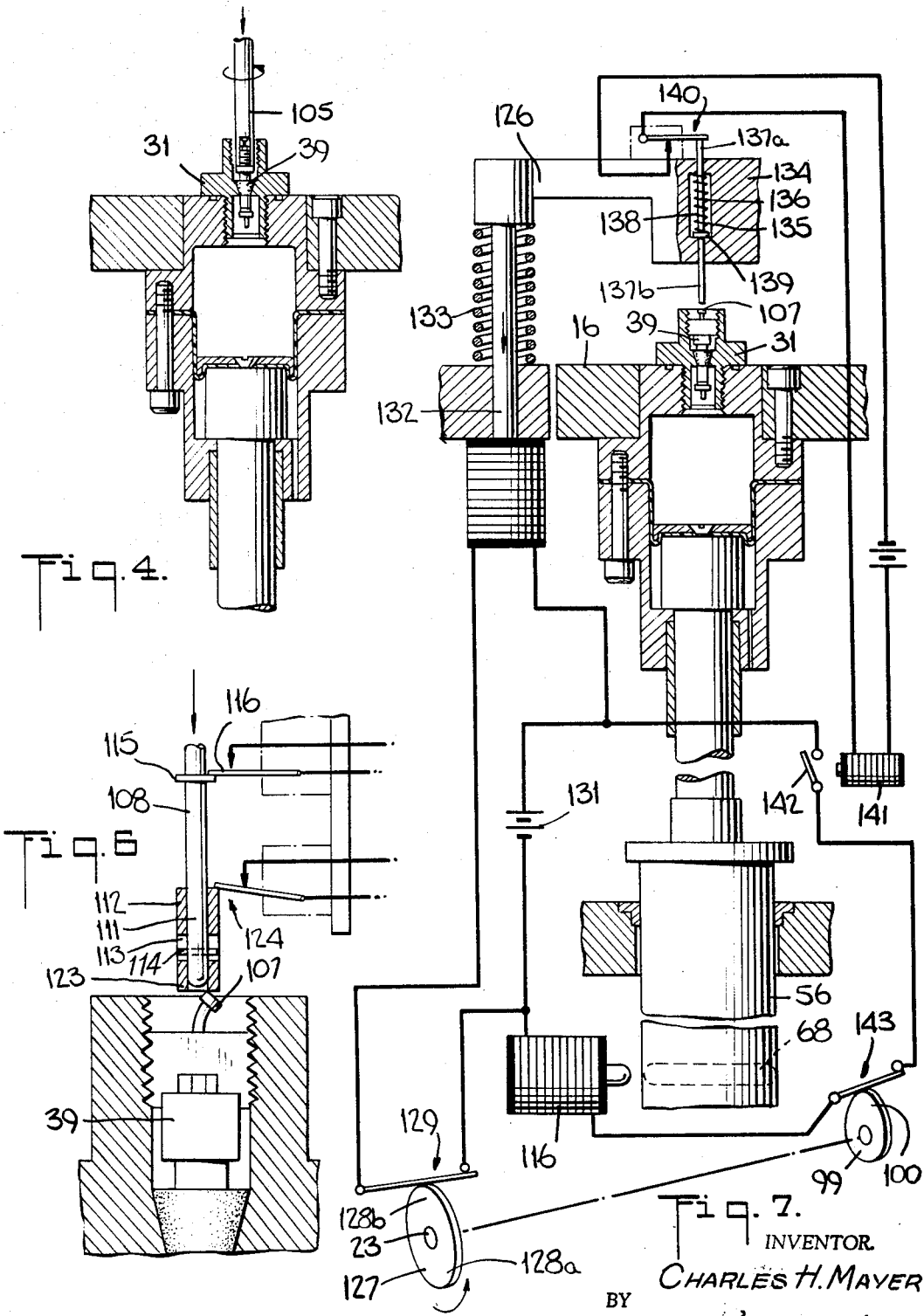

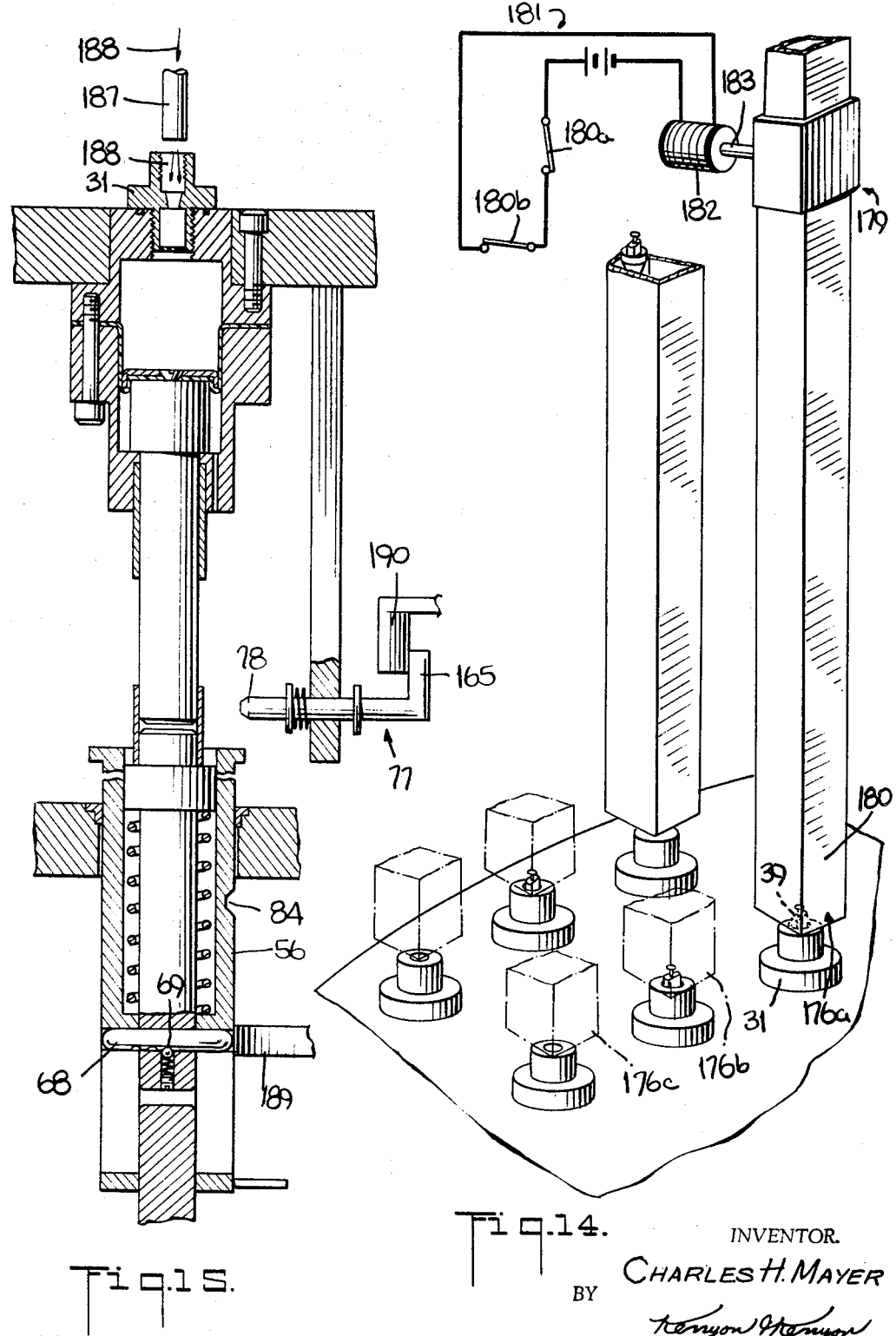

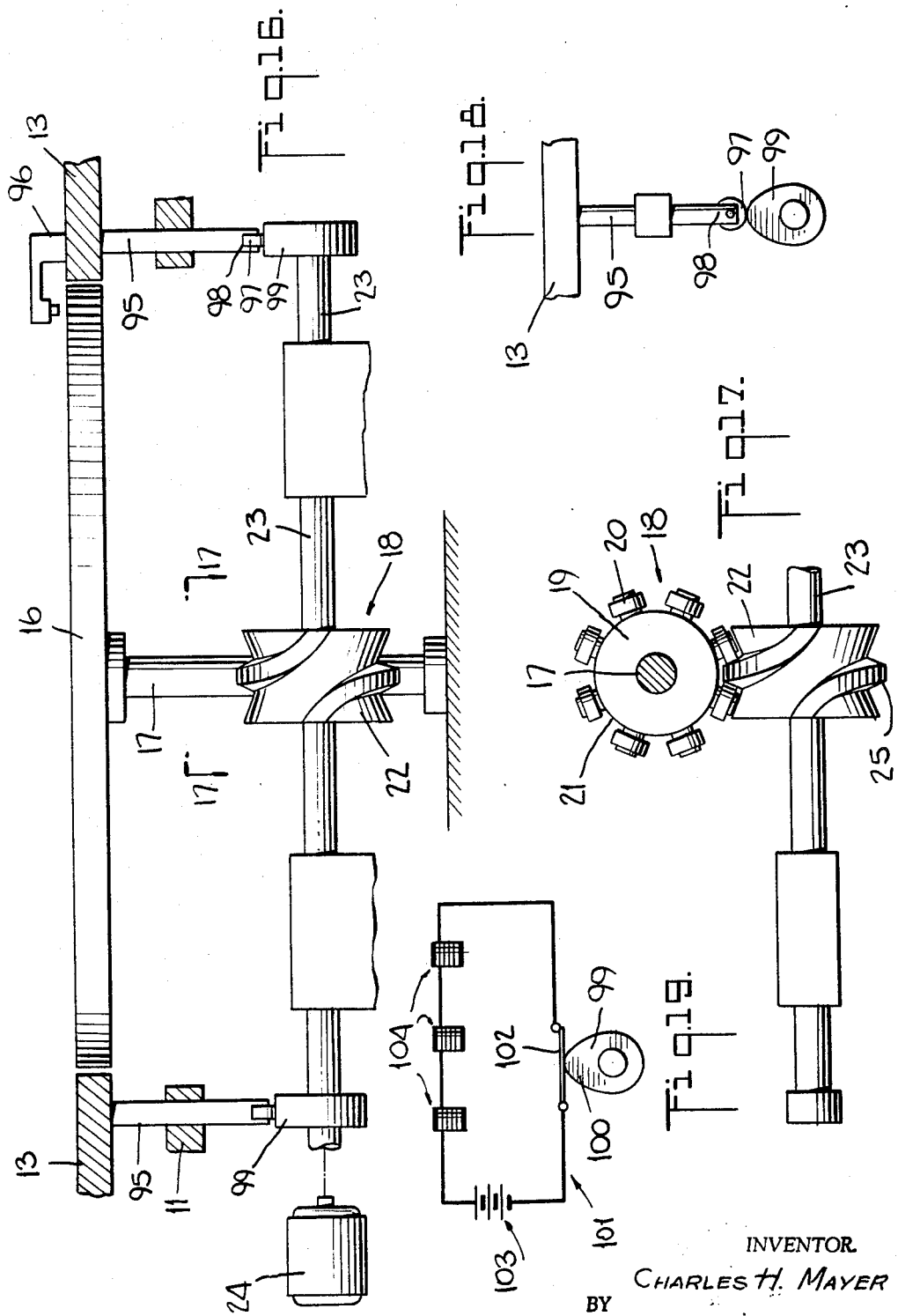

United States Patent Office 3,394,584
Patented July 30, 1968

3,394,584
VALVE CORE TESTING MACHINE
Charles H. Mayer, Stratford, Conn., assignor to National Distillers and Chemical Corporation, Richmond, Va., a corporation of Virginia
Filed May 4, 1966, Ser. No. 547,542
5 Claims. (Cl. 73—45.2)

ABSTRACT OF THE DISCLOSURE

A tire valve core testing machine is disclosed as including an intermittently rotated table which has a plurality of test cells on its periphery. Each cell is adapted to receive a tire valve core. Different test stations overlay the periphery of the rotating table so that specific tests may be conducted on the tire valve core therein. A few of the tests performed but not all are for tire pin orientation and resistance to leakage.

---

This invention relates to apparatus for automatically performing quality controlled tests on valve cores or similar devices and more particularly to apparatus for relatively high volume testing of tire valve cores by new and novel means.

In the manufacture of tire valve cores it is essential that each valve core be tested for proper functioning at the point of manufacture to insure that each core meets certain specified quality control standards to insure uniformity. Furthermore it is likewise essential that the required quality control tests be made quickly and efficiently and reliably on a high volume basis so that the cost of performing such tests will not result in any appreciable increase in the manufacturing costs.

Prior art testing of valve cores has been on a semiautomatic basis to the extent that each valve core is given a pressure test to insure that it is capable of maintaining a pressure tight seal at a given level. Other mechanical tests on valve cores have been performed, if at all, on a manual basis, amounting in most instances to mere visual inspection rather than actual operational testing.

The present invention provides a rapid and economical method of testing tire valve cores to insure that they will not leak under normal operating conditions as well as to inspect the core performance by subjecting the cores to preselected mechanical and electrical operational tests (hereinafter sometimes referred to collectively as "mechanical" tests). More specifically, the present invention provides automatic testing of valve cores to determine their capability of maintaining a releasable seal at twenty-five pounds air pressure, to determine the presence of threads on the screw plug of the device, to ascertain that the core seats properly in its adapter insert, that the center pin is present, of proper height and not bent, that the core opens and closes properly after each such opening, and that the spring is operational. Furthermore the present apparatus has a production capability substantially beyond prior art machines and operates at a very high efficiency. In addition, the present apparatus provides means for grading valve cores into different specified classes such as fast leakers, moderate leakers and non-leakers.

Briefly the apparatus of the present invention comprises a rotatable turntable, a plurality of test cells carried by said turntable and disposed at spaced positions around the periphery thereof, and feed means for feeding valve cores to be tested to said test cells. Means is included for connecting said cores with said test cells, and stationary test stations are disposed at spaced positions from said turntable adjacent the periphery thereof. Means is provided for imparting intermittent rotary motion to the turntable to present successive test cells to the respective test stations and there are means at each test station to run a preselected mechanical test on the valve core in each said test cell as it is presented to each said station. There are indicator means on the test cells to indicate the test results for each valve core and distributing means at terminal test stations to collect the tested valve cores in selected groups. Sensing means at said terminal test stations actuate said distributing means in response to said indicator means to group said valve cores according to said test results.

Each test cell on the turntable is comprised of a cylinder member having an outlet at one end adapted to receive a tire valve core and releasably retain it exposed to the internal pressure therein. Piston means in each cylinder provides variable fluid pressure in the cylinder and lost-motion means associated with said piston means is reversibly movable from a released position out of contact with said piston means into an operative position wherein said piston means is moved into an increased pressure condition in said cylinder. Latch means is provided for holding said lost-motion means in said operative position and there is means for causing the latch means to release the lost-motion means upon fluid leakage of a predetermined magnitude from said cylinder through said tire valve core.

Other objects and features of the invention will become apparent in the following description and claims and in the drawings in which:

FIG. 1 is a perspective view showing an embodiment of the machine;

FIG. 2 is a schematic layout of the test cells and the stationary testing stations;

FIG. 3 is an enlarged fragmentary sectional view of one of the test cells as associated with the core feeding means;

FIG. 4 is an enlarged fragmentary section of the test cell and automatic screwdriver means;

FIG. 5 is a fragmentary section of a test cell and associated circuitry for checking for center pin height and for bent center pins;

FIG. 6 is an enlarged fragmentary view similar to FIG. 5;

FIG. 7 is a fragmentary section of a test cell with associated components for checking center pin spring operation;

FIG. 8 is a fragmentary section of a test cell and associated water delivery means;

FIG. 9 is a fragmentary section of a test cell and associated probe means for determining presence of water;

FIG. 10 is a fragmentary section of a test cell and associated electrical and mechanical means for actuating latch and memory tab means;

FIG. 11 shows the probe means of FIG. 9 and associated air jet device;

FIG. 12 is an enlarged fragmentary section of a test cell and associated water removal means;

FIG. 13 is an enlarged fragmentary view of trip latch cam means on each test cell;

FIG. 14 is an enlarged fragmentary sectional view of valve core removal means;

FIG. 15 is an enlarged fragmentary section of the test cell and associated parts at the resetting station;

FIG. 16 is a fragmentary elevation of the drive means for the dial and associated mechanical means for actuating the stationary test means;

FIG. 17 is a partial plan view of the device shown in FIG. 16;

FIG. 18 is a partial side elevation of the device shown in FIG. 16; and

FIG. 19 is a schematic of another embodiment for actuating stationary test means by electro-mechanical apparatus.

Referring now to the drawings, and in particular FIGS. 1 and 2, apparatus constructed according to the present invention is shown and designated generally by reference numeral 10. It is comprised of a stationary base platform 11 resting on conventional support means 12 and carrying another somewhat smaller platform 13 supported above it on legs 14. Platform 13 has an inner circular edge 15 defining a central space within which is disposed circular plate or dial 16 dimensioned to fit therein. Dial 16 is rotatably mounted for rotation about its center as shown in FIG. 16 and is affixed to vertical shaft 17 at its underside by conventional means and intermittent rotary motion is transmitted thereto by indexing means 18 (see also FIG. 17).

The indexing mechanism may be, for example, a "Ferguson drive" (manufactured by Ferguson Machinery Company of St. Louis, Mo.) consisting of circular collar 19 affixed to shaft 17 by any conventional means such as a conventional slot and key means (not shown), said collar 19 having a plurality of follower members 20 rotatably mounted and disposed around the periphery thereof as shown, said followers being engageable with threaded driver cam 22 mounted on transverse drive shaft 23 driven at a uniform rotational speed by electric motor 24 or the like. The contour of cam surface 25 is such as to provide intermittent rotation of shaft 17 with a maximum dwell time or stationary period, thereby rotating dial 16 with respect to platform 13 in a corresponding fashion. The indexing mechanism is driven by the above described apparatus to provide approximately one-half to one complete revolution a minute. It is preferable that the drive should be equipped with an electric brake (not shown).

Dial 16 is provided at its periphery with a plurality of test cell locations 26 disposed in side by side pairs as shown in FIG. 1, each test cell location having associated therewith a test cell 27 (see also FIG. 3). The test cell 27 consists of a circular base member 28 disposed in mounting hole 29 of the dial 16 at the test cell location 26 and is secured to the dial by any suitable means such as recessed bolt means 30. A hardened steel insert 31 is removably secured to circular base member 28 by a threaded portion 32 which is screwed into complementary threaded portion 33 of the base member through the upper face 34 thereof. Integral flange portion 35 of insert 31 abuts against said upper face 34 and washer means 36 is provided at the interface to seal against leakage.

The upper portion of insert 31 is provided at its outer end 37 with an internally threaded portion 38 adapted to receive in threaded engagement valve core member 39 and an internal tapered seat 40 is included at an intermediate portion of insert 31 against which the core 39 is seated in a conventional fashion. Wire screen 41 is disposed at the bottom end of the lower internal bore 42 of insert 31 to prevent dirt and foreign objects from entering test cell 27 through the bore of the insert 31.

Joined to the bottom of base member 28 is bottom housing member 43 which, together with base member 28, defines internal cylindrical cavity 44 within which is axially movable, in a vertical direction as viewed in FIG. 3, bellowfram-type piston 45. Rolling diaphragm 46 of rubber or the like is held at its outer periphery 47 between base member 28 and bottom housing 43, the latter parts being held together by bolt means 48. Diaphragm 46 is joined at its central portion 49 to piston 45 by cover clamp 50 and mounting screw 51. As is already known, diaphragm 46 is dimensioned such that it will permit movement of piston 45 from a downward position relative to cylinder 44 as shown in FIG. 3 to an upward position as shown in FIG. 10 for purposes to be described.

Joined to piston 45 and extending downwardly as viewed in FIG. 3 therefrom is rod member 52, slideably disposed in bore 53 extending through the bottom of housing 43. Sleeve insert 54 provides a bottom guide extension for bore 53. Exhaust port 55 provides communication between cylinder 44 and the atmosphere to permit axial reciprocation of piston member 45 without back pressure.

Disposed beneath the abovementioned elements of test cell 27 and aligned therewith is a "lost motion" device including an indicator sleeve 56 having abutment flange 57 at its upper end 58 and slideably mounted in hole 59 extending through subplatform 56a joined by suitable means (not shown) to dial 16, of the same relative size and shape as the latter, and designed to rotate therewith. Guide insert 60 is provided in the upper face 61 of platform 56a to provide a centering mount for sleeve 56. Disposed within internal bore 62 of sleeve 56 is plunger 63 having an enlarged radially extending portion or head 64 near its upper end 65, said head 64 being dimensioned to fit relatively snugly yet slideably in said bore 62. Adjacent lower end 66 of plunger 63 is lateral bore 67 extending therethrough and receiving slideable pin member 68. Pin member 68 has a plurality of indentations 69 in its lower surface engageable in different relative lateral positions by ball detent 70 disposed in axial bore 71 communicating with bore 67, said ball 70 being urged upwardly against pin member 68 by spring means 72. Recessed screw means 73 in the bottom face 74 of plunger 63 permits access to detent means 70 and also provides tensioning adjustment for spring 72.

Coil spring 75 disposed in bore 62 of sleeve member 56 is cencentrically mounted relative to plunger 63 and bears upwardly against head 64 and normally urges said head upwardly relative to said sleeve 56. Extension sleeve 76 is provided at upper end 65 of plunger 63 to aid in registering plunger 63 with aligned rod member 52 of piston 45 for maintaining alignment thereof and insuring responsive cooperative axial movement of the two members.

Referring now to FIG. 10 latch means 77 is provided to releasably lock sleeve member 56 in an upward position when piston 45 is in its starting or full upward position relative to cylinder 44. The latch means comprises laterally extending key 78 slideably disposed in mounting hole 79 in partition member 80 which is joined to and extends downwardly from dial 16. Key 78 has a horizontal shank portion 81 with integrally formed enlarged collar members 82 at axially spaced positions thereon at opposite sides of partition 80 to provide lateral sliding limit positions of key 78 relative thereto. Spring means 83 disposed between the right hand collar member and partition 80 provides normal bias of key 78 to the right as viewed in FIG. 10 into releasable locking engagement with notch 84 in the opposed surface of sleeve 56 to retain the latter in its aforesaid upper position as shown.

The tension provided by spring 75 of sleeve 56 in the latched position of the latter as shown in FIG. 10 provides in the upper space 85 of cylinder 44, with the piston 45 in its upward position, a testing pressure of about twenty-five pounds (gage) through an approximately 2.7 to 1 piston displacement to provide suitable testing pressure for valve core 39 in a manner to be described further hereinafter.

As shown in FIG. 1, a plurality of stationary test stations 86 are mounted on upper stationary platform 13 at spaced positions around dial 16, each having respective test apparatus thereon for conducting a specific different mechanical or electric test on the valve cores presented to such station during the dwell periods between successive stepwise rotary movements of dial 16. The starting index point of the dial 16 is designated by the letter A on FIG. 1. At this station valve cores 39 are delivered in the proper endwise position to the inserts 31 at such station by means of a pair of vibratory feed means 87 having delivery chutes 88 disposed with their respective delivery ends 89 appropriately disposed over said inserts 31. Escapement means 90 (see FIG. 3) is provided at the delivery end 89 of each chute 88 to insure that only one core will drop from each chute 88 at each index of dial 16.

At the next station in sequence is torque limiting screwdriver means 91 comprised of electric motor means 92 mounted with its drive shaft 93 facing downwardly along a vertical axis, said motor 92 mounted on a suitable bracket member 94. Said bracket member 94, as other mounting standards carrying the other testing apparatus at subsequent test stations, is mounted for vertical shifting movement so that the motor 92 and related parts to be described will be moved vertically downward for cooperative action on the valve test cores and then vertically upward out of engagement with said test cores to permit movement of dial 16 to its next position. One such arrangement for providing the vertical movement of the test station apparatus is shown in FIG. 16 by extensions 95 which are integrally connected with the test station apparatus 96 above platform 13 and extend downwardly, having roller members 97 at their lower ends 98 riding on eccentric cam members 99 keyed to shaft 23 (see also FIG. 18). Another means for providing the aforesaid vertical movement of the testing apparatus is shown diagrammatically in FIG. 19 wherein cam 99 on a high point 100, corresponding to a time just prior to the next indexing movement of dial 16, closes electrical circuit 101 by means of switch 102 thereby applying voltage from battery 103 to solenoids 104 associated with extensions 95 of the test stations to move them in a vertical upward direction. Any such conventional means may be employed, the above mechanical and electrical simplified arrangements being shown herein generally to suggest suitable means for accomplishing the intended purpose of the device and its proper function.

Said shaft 93 of electric motor 92 carries a pair of torque limiting screwdriver members 105 (see also FIG. 4) each of which, with the appropriate cam timing described above, moves downwardly to engage the respective valve core 39 and thread it into insert 31 with the appropriate predetermined torque. Thereafter the screwdrivers 105 are again moved vertically upward to their starting position.

At the third station 106 (see FIGS. 5 and 6) means is provided to check for proper height of the valve core center pin 107 and simultaneously to check for a bent center pin as shown in FIG. 6. This is accomplished by means of vertical rod 108 which is spring loaded axially by coil spring 109 with respect to its holder 110 mounted on platform 13 for reciprocal vertical movement as described for the previous station. At the lower end 111 of rod 108 is disposed sleeve member 112 which has lateral bore 113 extending therethrough at an intermediate portion permitting in conjunction with radial pin 114 in rod 108, vertical sliding movement of sleeve 112 relative to rod 108 between vertically limited positions. As rod 108 is lowered by its holder 110 in accordance with the previously described timing sequence, the presence of a valve core pin 107 having too great a height relative to the valve core 39 will result in collar 115 closing switch contact 116 thereby completing an energizing circuit for electromagnetic coil 117 which closes switch 118, energizing solenoid 119 and thereby causing movable solenoid armature 120 to move laterally to the right and push "memory" pin 68 to the right to engage notch 69a with ball detent 70 so that the right hand end of memory pin 68 extends laterally out of sleeve 56 (see also FIG. 3).

Likewise, if the center pin 107 is too low collar 121 closes switch contact 122 to energize the electrical circuit described above in the same fashion with the same result of positioning of memory pin 68 at notch 69a. A properly aligned center pin 107 will be received in sleeve 112 upon downward movement of rod 108 and sleeve 112 will remain in a downward position relative to lateral pin 114. However, as shown in FIG. 6, the presence of a bent center pin 107 will cause engagement thereof with sleeve end 123 causing sleeve 112 to move upwardly relative to rod 108 and close switch contact 124, energizing solenoid 119 and positioning memory pin 68 in the same manner as for the other two described situations.

Consequently, at this third station 106, the presence of either too high or too low or a bent center pin 107 will result in memory pin 68 sticking out from sleeve 56 by an amount determined by detent 69a. In addition, energizing of solenoid 119 at this station due to the aforementioned defects will result in disabling of the electrical systems at subsequent testing stations by any suitable conventional means (not shown).

At the next successive or fourth station 125 (see FIG. 7) the center pin 107 is depressed twice. If no core is present, or if there is no pressure from the spring (not shown) of the valve core 39, memory pin 68 will be pushed out to the first detent 69a, if it had not already been pushed out at the immediately preceding station, and the electrical system at subsequent test stations will be disabled in the same fashion.

The provision for lowering the test holder 126 twice at the dwell period is provided by cam 127 geared to shaft 23, said cam 127 having two opposed high points 128a and 128b, said high points each closing electrical switch 129 and thereby completing the electrical circuitry delivering to solenoid 130 voltage from supply battery 131 and causing armature 132 associated with holder 126 to move downwardly against the bias of coil spring 133 carrying holder 126 downwardly with it. In outer extension 134 of holder 126, disposed in overlying relationship to insert 31 on dial 16, is a cylindrical recess 135 in axial alignment with valve core 39. Mounted in recess 135 is slideable rod 136 having upper and lower extensions 137a and 137b, respectively, extending above and below the holder 126 as shown in FIG. 7. Rod 136 is biased in a downward direction relative to holder 126 by coil spring 138 and collar 139 integrally formed with rod 136. Upon engagement of rod end 137b with valve core pin 107 during downward movement of holder 126 in the above described fashion, rod 136 moves upward relative to holder 126 and upper end 137a opens normally closed electrical contacts 140, thereby de-energizing the electrical circuit of electromagnetic coil 141 so that switch 142 is open when high point 100 of timing cam 99 closes normally open contacts 143 during the appropriately timed test sequence. Absence of core 39 altogether, or absence of valve core spring (not shown) will result in contacts 140 remaining closed upon downward movement of holder 126 with consequent energizing of coil 141, closing electrical contact 142 so that upon closing of contacts 143 by high point 100 of cam 99, solenoid 116 will thereby be energized to push memory pin 68 outwardly from sleeve 56 to first detent 69a as previously described. Positioning of memory pin 68 in the latter fashion disables the electrical circuits of subsequent test stations.

At the fifth station 144 in the sequence a predetermined amount of water is released into the mouth or cavity 145 of the insert 31 on top of valve core 39 (see FIG. 8). Water delivery means is provided by pipette arm 146 which extends over dial 16 and has a downwardly extending branch 147 aligned with each insert 31 for delivering water as shown in FIG. 8. Means (not shown) may also be provided at or just adjacent to this station for removing excess water from the insert so that the surface of the water in the mouth 145 will be level with the top 148 thereof. The pipette arm 146 may either be mounted for vertical shifting movement as described for the preceding stations or it may be mounted in a fixed vertical position relative to dial 16 as desired.

At the sixth station 149 a check is made to determine the presence of water 150 in the insert mouth 145 (see FIG. 9). Holder 151 vertically actuated in timed sequence as, for example, holders 110 and 126, has for each insert electrical probes 152a and 152b which extend downwardly into mouth 145 of insert 131 on either side of valve core pin 107 upon downward timed movement of holder 151. The length of probes 152a, 152b are such that they will extend into water 150 if it is present and will thereupon close an electrical circuit similar to that shown in FIG. 5 and described in connection with third station 106, the probes and water acting as the equivalent, for example, of electrical contacts 124 in the latter described circuit and actuating a solenoid such as 119 of FIG. 5 to position memory pin 68 at notch 69a and disabling the electrical circuits at subsequent testing stations (means not shown).

Upon retraction of electrodes 152a and 152b from contact with water 150 a stream of warm air is blown against the bottoms of said electrodes from jet 152c to remove any adhered water droplets from said electrodes (see FIG. 11).

At the seventh station 153 (see FIG. 10), which may be at the next adjacent stationary position following the sixth station 149, or preferably is several subsequent positions removed therefrom as shown in FIG. 1, means is provided for creating a pneumatic pressure in each test cell 27 and checking for fast leaking valve cores 39. Holder 154 carries downwardly extending electrode member 155 for each insert 31 which, on the downwardmost position of movement of holder 154, is positioned at a predetermined spaced distance from upper end 148 of insert 31. Simultaneously with said downward movement of holder 154 a solenoid 104 (see FIG. 19) similar to those used for actuating the test station holder arms is actuated to cause movable armature 156 to move upwardly as viewed in FIG. 10 causing its upper enlarged end portion 157 to engage bottom end 158 of sleeve 56 and move the latter into its upward latched position and thereby move piston 45 into its upward high pressure position. This action causes the creation of approximately 25 p.s.i. (gage) in upper space 85 and subjects core 39 to said pressure.

Fast leaking of core 39 will cause the water meniscus (not shown) in insert mouth 145 to move upwardly and contact electrode 155 closing electrical circuit 159. The latter action energizes electromagnetic coil 160, closing switch 161 and energizing solenoid 162, moving armature 163 to the left as viewed in FIG. 10, or to the right as viewed in FIG. 13. Arm 164 on armature 163, engaging upwardly extending finger 165 on horizontal shank portion 81 of latch means 77, thereby moves to the right as viewed in FIG. 13 and causes key 78 to move out of engagement with notch 84 in sleeve 56, causing the latter to move downwardly to its bottom position in response, to urging of spring 75 therein. This movement is possible because the armature 156 will have been retracted by this time.

Upon retraction of sleeve 56 piston 45 and associated parts also move to a downward position such as shown in FIG. 3. If there is a slow leak or none at all the plunger or piston 45 will remain in the upward position as shown in FIG. 10.

When arm 154 is returned to its upward position away from insert 31 a jet of warm air is applied to the surface of each electrode 155 by nozzle 155a to remove any moisture that may have been deposited thereon from a leaking core so that when the next successive core is tested on the dial 16 no spurious results will be indicated.

At a subsequent angular position relative to dial 16 is an eighth test station 164 for testing for the presence of moderate leakers. The precise location of this station depends on the specific quality standards involved. The station may be located at any specific relative position on platform 13 as desired. At this station the electrical apparatus is similar to that shown at FIG. 10, except that solenoid 165 replaces solenoid 160 in electrical circuit 159 and solenoid 162 and associated circuitry is elemental. Memory pin 68 is positioned laterally by armature 166 upon detection of a moderate leaker by engagement of contact 155 by the extended water meniscus (not shown).

Thus a moderate leaker is indicated by sleeve 56 being in its upward position as shown in FIG. 10 with memory pin 68 positioned to the right (shown by dotted lines) at the first notch 69a.

The ninth station 167 (see FIG. 1) involves similar circuitry and apparatus as at the eighth station, and the presence of slow leakers (designating valve cores leaking at a slower rate than moderate leakers) will cause positioning of memory pin 68 to the second notch 69b, i.e. at a lateral position outwardly from sleeve 56 greater than that for notch 69a.

Subsequent to any pair of inserts 31 being presented to ninth station 167, tested valve cores will be classified or indicated in the following manner by the vertical positioning of sleeve 56 and lateral positioning of memory pin 68. If the center pin is of improper height, bent, valve core missing, valve core spring missing, or no water present in insert mouth 145, the sleeve 56 will be in the down position and memory pin 68 will be positioned laterally at indentation 69a relative to ball detent means 70. If a given valve core has successfully passed all those tests but is a fast leaker, then sleeve 56 will be in the down position and memory pin 68 will be centered with respect to sleeve 56. If the core is satisfactory except that it is a moderate leaker, the sleeve 56 will be up and memory pin 68 will be at indentation 69a. If the core is satisfactory except that it is a slow leaker then sleeve 56 will be up and memory pin 68 will be at its outermost extended position 69b. Thus the valve cores can be graded and selectively removed from the test cell insert 31 according to the combined relative positions of memory pin 68 and sleeve 56. Such grading takes place at terminal stations 168 to be described hereinafter. At tenth station 169 water is removed from insert mouth 145 by means of vertical tube 170 interconnecting with a vacuum system (not shown). Said tube 170 extends downwardly from and is actuated by holder 171 in a manner similar to that of the other holders described above.

At eleventh station 172 screwdriver means 173 similar to that for station two (reference numeral 91) is provided and actuated in a like fashion except that the screwdriver means 174 is engaged with valve insert 39 to threadably remove it from engagement with insert 31.

At the twelfth, thirteenth and fourteenth stations generally designated by reference numeral 168 (see FIG. 14) the valve cores are selectively removed into exhaust conduits 176a, 176b and 176c respectively in accordance with the quality control grading established by relative positions of sleeve 56 and memory pin 68 for each core. Appropriately located microswitches (not shown) are provided at each of these three terminal stations to be actuated by the memory pin 68 and sleeve 56. Thus at the twelfth station 175 the good cores are withdrawn into vacuum conduit 176a. Rectangular conduit 176a interconnects with a vacuum system (not shown). At an intermediate portion of its length is located a solenoid actuated valve 179. The valve is normally open, i.e. vacuum is normally applied through the valve to bottom 180 of conduit 176a. Upon encountering either sleeve 56 at its bottom position or memory pin 68 at either of its laterally extending positions 69a or 69b, normally closed electrical switches 180a or 180b, respectively, will be opened, thereby opening electrical circuit 181, de-energizing solenoid 182, and through armature 183 closing valve 179, thereby removing the vacuum from conduit bottom 180 so that no valve core will be removed from an inert 31 passing thereunder. It is to be understood that a solenoid circuit arrangement can be employed wherein the valve 179 is normally closed and the solenoid 182 normally de-energized and switches 180a or 180b are normally open, whereupon the solenoid 182 will be energized to cause removal of good cores at this station. The present circuit arrangements are described for the reverse situation. In either event, good cores would be removed by the vacuum system into conduit 176a unless the memory pin 68 and/or the sleeve 56 prevent it by the actuation of microswitches.

At the thirteenth station 184 cores with defective center pins and fast leakers are removed, the vacuum system being applied to conduit 176b by appropriate actuation of electrical circuitry by sleeve 56 being in its down position and/or memory pin 68 being laterally outward at detent position 69a.

At fourteenth station 185 moderate leakers are removed. The vacuum system is interconnected with conduit 176c by actuation of the solenoid valve thereon (not shown) actuated by sleeve 56 being in its upper position and memory pin 68 being at detent position 69a. A fifteenth station (not shown) would be employed to selectively remove slow leakers in a similar fashion as designated by sleeve 56 being in its upper position and memory pin 68 being at detent position 69b. At sixteenth station 186 (see FIG. 15) compressed air supply tube 187 is lowered adjacent insert 131 and directs a stream of air downwardly as shown by arrows 188 to blow the test cell free of water and foreign particles, if any, and memory pin 68 is reset to its center position as shown in FIG. 15 by any convenient electrically operated means such as armature 189, and sleeve 56 is returned to its down position, if not already there, by any suitable electrically operated tripping mechanism 190 which engages finger 165 on latch means 77 to move key 78 out of notch 84 of sleeve 56. Armature 189 and tripping mechanism 190 can be actuated by any suitable means such as solenoid 104 as shown in FIG. 19 and described previously.

The sequence of testing operations is shown in FIG. 2 and it is to be understood that the arrangement of stationary test stations may be altered considerably from that shown to accomplish various types of core grading as may be desired. However the overall arrangement provides an efficient and reliable basis for testing and grading valve cores at high rate well above that provided by any of the prior art techniques.

It is to be understood that changes and additions may be made by those skilled in the art without departing from the scope and spirit of the invention.

I claim:

1. Tire valve core testing apparatus comprising a hollow cylinder member having compressible fluid therein, an outlet at one end adapted to receive a tire valve core and releasably retain it exposed to the internal pressure therein, piston means in said cylinder to provide variable fluid pressure in said cylinder by said piston compressing the fluid therein, lost-motion means associated with said piston means reversibly movable from a released position out of contact with said piston means into an operative position wherein said piston means is moved into an increased pressure condition in said cylinder, latch means for holding said lost-motion means in said operative position, automatic means for causing said latch means to release said lost-motion means upon fluid leakage of a predetermined magnitude from said cylinder through said tire valve core.

2. Tire valve core test cell apparatus comprising a receptacle head member having an axial bore with an internally threaded end portion and an inner tapered seat portion spaced inwardly therefrom adapted to receive and engage a tire valve core to be tested, a cylinder member adjoining said head member and communicating with said bore, a piston movable in said cylinder, a flexible diaphragm disposed within said cylinder having an intermediate portion engageable by said piston and affixed to the wall of said cylinder at its edge portion, said diaphragm dimensioned to permit limited axial movement of said piston in said cylinder toward said head to increase the fluid pressure in said cylinder, a piston rod connected to said piston and extending axially through the end of said cylinder remote from said head, a slide rod member movable into contact with said piston rod at its end, a movable sleeve member surrounding said slide rod, spring means disposed within said sleeve, an enlarged intermediate portion on said slide rod capturing said spring means between it and said sleeve, latch means for releasably holding said sleeve at an inward position relative to said piston-rod where the compression of said spring means forces said piston by means of said slide rod toward said head to an increased pressure position, means for moving said sleeve into such latched position, electrical circuit means including in series a probe movable adjacent the threaded end of said head to a position at which a measured quantity of water added on top of a valve core engaged therein will expand under leakage conditions of said core when subjected to said increased pressure condition and provide a closed electrical circuit to actuate said latch means to release said sleeve, and tab means in said sleeve reversibly movable from an exposed position to a concealed position relative to said sleeve.

3. Tire valve core test cell apparatus comprising a receptacle head member having an axial bore with an internally threaded end portion and an inner tapered seat portion spaced inwardly therefrom adapted to receive and engage a tire valve core to be tested, a cylinder member adjoining said head member and communicating with said bore in axial alignment therewith, a piston movable in said cylinder, a flexible diaphragm disposed within said cylinder having an intermediate portion joined to said piston and affixed to the wall of said cylinder at its edge portion, said diaphragm dimensioned to permit limited axial movement of said piston in said cylinder toward said head to increase the fluid pressure in said cylinder, a piston rod connected to said piston and extending axially through the end of said cylinder remote from said head, a slide rod member axially aligned with said piston rod and movable into contact therewith at its end, a movable sleeve member surrounding said slide rod, spring means disposed within said sleeve, an enlarged intermediate portion on said slide rod capturing said spring means between it and said sleeve, latch means on a common support with said cylinder for releasably holding said sleeve at an inward position relative to said piston-rod where the compression of said spring means forces said piston by means of said slide rod toward said head to an increased pressure position, means for moving said sleeve into such latched position, electrical circuit means including in series a probe movable adjacent the threaded end of said head to a position at which a measured quantity of water added on top of a valve core engaged therein will expand under leakage conditions of said core when subjected to said increased pressure condition and provide a closed electrical circuit to actuate said latch means to release said sleeve, and tab means in said sleeve reversibly movable from an exposed position to a concealed position relative to said sleeve.

4. Apparatus for automatically testing and grading tire valve cores comprising a rotatable dial, a plurality of test cells each adapted to receive tire valve cores for testing disposed around the periphery of said dial, feed means for feeding valve cores to said test cells, a plurality of stationary test stations overlying said periphery and each having means movable into engagement with said test cells for conducting different mechanical tests on said cores, indexing means interconnected with said dial for rotating the same step-wise to present said test cells to successive of said test stations, mechanical indicator means on said test cells to indicate the test results for said cores, grading means at terminal test stations to receive valve cores grouped according to said test results, and sensing means adjacent said terminal stations to actuate said grading means in response to said indicator means, said test cells comprising a receptacle head member mounted on said dial having an axial bore extending upwardly with an internally threaded end portion and an inner tapered seat portion spaced inwardly therefrom adapted to receive and engage a tire valve core to be tested, a depending cylinder member adjoining said head member and communicating with said bore in axial alignment therewith, a piston movable in said cylinder, a flexible diaphragm disposed within said cylinder having an intermediate portion joined to said piston and affixed to the wall of said cylinder at its edge portion, said diaphragm dimensioned to permit limited axial movement of said piston in said cylinder toward said head to increase the fluid pressure in said cylinder, a piston rod connected to said piston and extending axially through the end of said cylinder remote from said head, a slide rod member axially aligned with said piston rod and movable into contact therewith at its end, a movable sleeve member surrounding said slide rod, spring means disposed within said sleeve, an enlarged intermediate portion on said slide rod capturing said spring means between it and said sleeve, latch means supported from said dial for releasably holding said sleeve at an upward position relative to said piston-rod where the compression of said spring means causes said slide rod to urge said piston upwardly toward said head to an increased pressure position, means for moving said sleeve into such latched position, electrical circuit means including in series a probe movable adjacent the threaded end of said head to a position at which a measured quantity of water added on top of a valve core engaged therein will expand under leakage conditions of said core when subjected to said increased pressure condition and provide a closed electrical circuit to actuate said latch means to release said sleeve, and said mechanical indicator including tab means in said sleeve reversibly movable from an exposed position to a concealed position relative to said sleeve, and means interconnected with said stationary test stations for actuating said tab means in response to said mechanical tests.

5. Apparatus for automatically testing and grading tire valve cores comprising a rotatable dial, a plurality of test cells each adapted to receive tire valve cores for testing disposed around the periphery of said dial, feed means for feeding valve cores to said test cells, a plurality of stationary test stations overlying said periphery and each having means movable into engagement with said test cells for conducting different mechanical tests on said cores, indexing means interconnected with said dial for rotating the same step-wise to present said test cells to successive of said test stations, mechanical indicator means on said test cells to indicate the test results for said cores, grading means at terminal test stations to receive valve cores grouped according to said test results, and sensing means adjacent said terminal stations to actuate said grading means in response to said indicator means, said stationary testing stations being successively in the direction of rotation of said dial from said feed means: (a) torque limiting screw driver means for threading said valve cores into said test cells; (b) electrical contact means operable upon engagement with misaligned valve core pins to actuate said indicator means; (c) means for depressing said valve core pins and operable upon malfunction of said pins to actuate said indicator means; (d) pipette means to deliver a measured quantity of water onto the top of said valve cores in said test cells; (e) electrical probe means for detecting the presence of retained water on said valve cores; (f) additional electrical probe means at a plurality of spaced locations around said dial for detecting the expansion of water from said valve cores due to leakage of air through said cores at respectively different rates and for actuating said indicator means in response thereto; (g) means for removing retained water from said test cells; (h) means for unthreading said cores from said test cells; (i) vacuum grading means for selectively removing said valve cores from said test cells in response to said indicator means.

References Cited
UNITED STATES PATENTS

| | | | |
|---|---|---|---|
| 1,359,799 | 11/1920 | Gerhardt | 73—45.1 |
| 1,589,825 | 6/1926 | Staebler | 73—46 |
| 2,089,053 | 8/1937 | Donovan et al. | 73—45.2 |
| 2,319,501 | 5/1943 | Gora | 73—48 |
| 2,407,062 | 9/1946 | Darrah | 73—41 XR |
| 3,132,507 | 5/1964 | Dega | 73—45.2 |

DAVID SCHONBERG, *Primary Examiner.*

J. NOLTON, *Assistant Examiner.*